(12) United States Patent
Parker

(10) Patent No.: US 9,386,091 B2
(45) Date of Patent: Jul. 5, 2016

(54) SELF-ADAPTING DIRECT PEER TO PEER COMMUNICATION AND MESSAGING SYSTEM

(75) Inventor: Gregory T. Parker, New York, NY (US)

(73) Assignee: Raketu Communications, Inc., New York, NY (US)

(*) Notice: Subject to any disclaimer, the term of this patent is extended or adjusted under 35 U.S.C. 154(b) by 165 days.

(21) Appl. No.: 13/553,553

(22) Filed: Jul. 19, 2012

(65) Prior Publication Data

US 2013/0024515 A1    Jan. 24, 2013

Related U.S. Application Data

(60) Provisional application No. 61/510,817, filed on Jul. 22, 2011.

(51) Int. Cl.
*G06F 15/16* (2006.01)
*H04L 29/08* (2006.01)
*H04L 29/06* (2006.01)

(52) U.S. Cl.
CPC ............ *H04L 67/104* (2013.01); *H04L 63/107* (2013.01); *H04L 67/1057* (2013.01)

(58) Field of Classification Search
CPC . H04L 67/104; H04L 63/107; H04L 67/1057; H04L 63/0869; H04L 63/0876
USPC ........... 713/155, 156, 157, 158, 159; 709/204
See application file for complete search history.

(56) References Cited

U.S. PATENT DOCUMENTS

| | | | |
|---|---|---|---|
| 2004/0054885 A1* | 3/2004 | Bartram et al. | 713/152 |
| 2004/0064693 A1* | 4/2004 | Pabla et al. | 713/168 |
| 2006/0235967 A1* | 10/2006 | Fritz | 709/224 |
| 2008/0137663 A1 | 6/2008 | Gu et al. | |
| 2008/0289023 A1* | 11/2008 | Wardrop | 726/9 |
| 2010/0058405 A1* | 3/2010 | Ramakrishnan et al. | 725/97 |
| 2010/0260190 A1* | 10/2010 | Hiie et al. | 370/400 |
| 2012/0036564 A1 | 2/2012 | Gu et al. | |
| 2012/0304313 A1* | 11/2012 | Mao et al. | 726/29 |
| 2013/0166654 A1* | 6/2013 | Hjelm et al. | 709/204 |

* cited by examiner

*Primary Examiner* — Cheikh Ndiaye
(74) *Attorney, Agent, or Firm* — Michael J. Brown

(57) ABSTRACT

A system and method for communication and messaging among self-adapting peer nodes is disclosed, where each node maintains a list of authorized peer nodes. The nodes exchange requests directly with other nodes over networks, providing information identifying the requesting node and the type of request. The receiving node authenticates the requesting node, authenticates the type of request, and determines method of response to the request. If the request is authenticated and the type of request is valid, the receiving node also validates the incoming request and originating node and adapts its peer node database, applying any required changes. The types of requests exchanged between nodes include: status and location change, message, audio, voice, video, text, and data. The types of responses include: authorized, unauthorized, or ignore. The nodes may periodically send and receive requests for status, messages, and data updates from an optional central server.

16 Claims, 5 Drawing Sheets

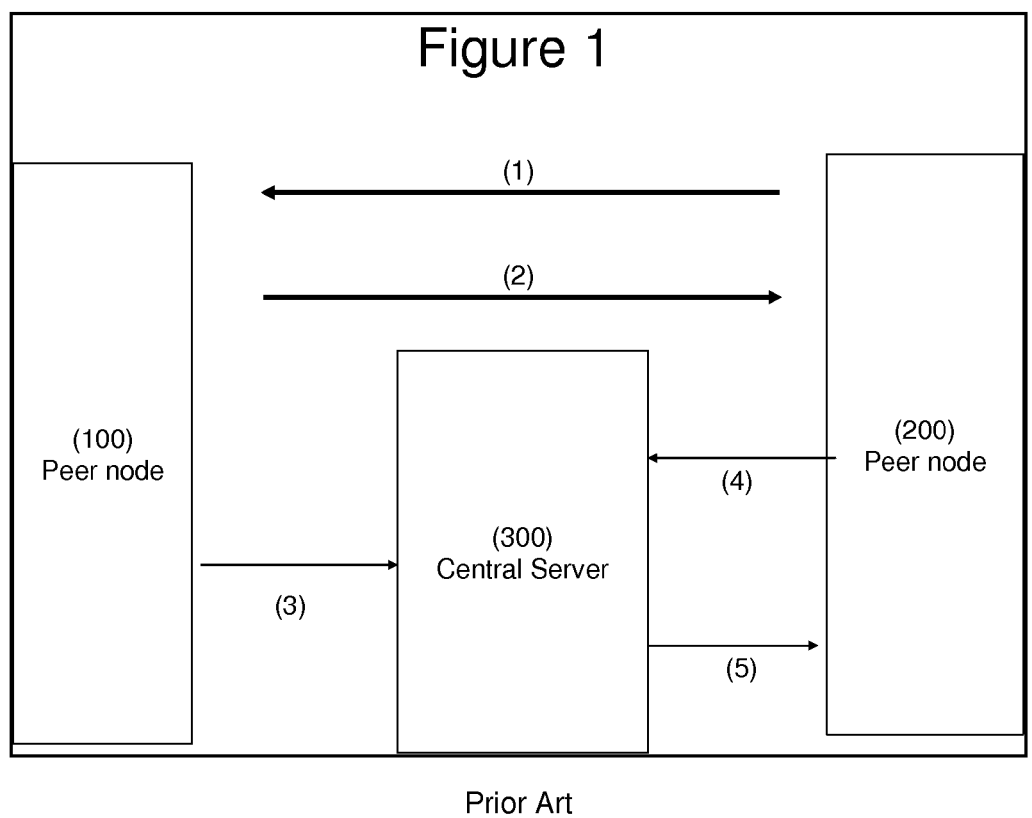
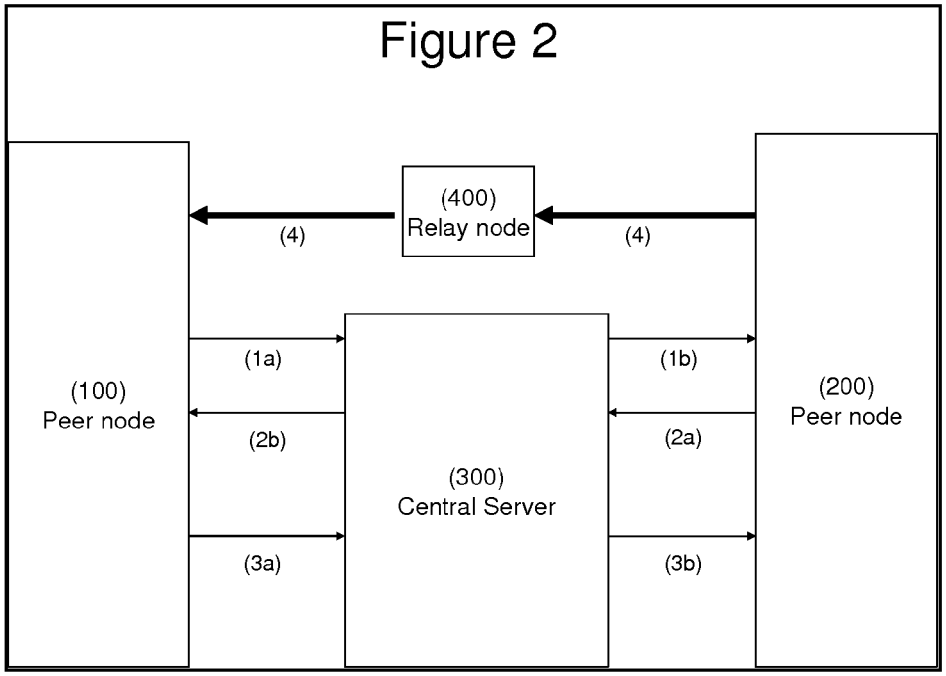

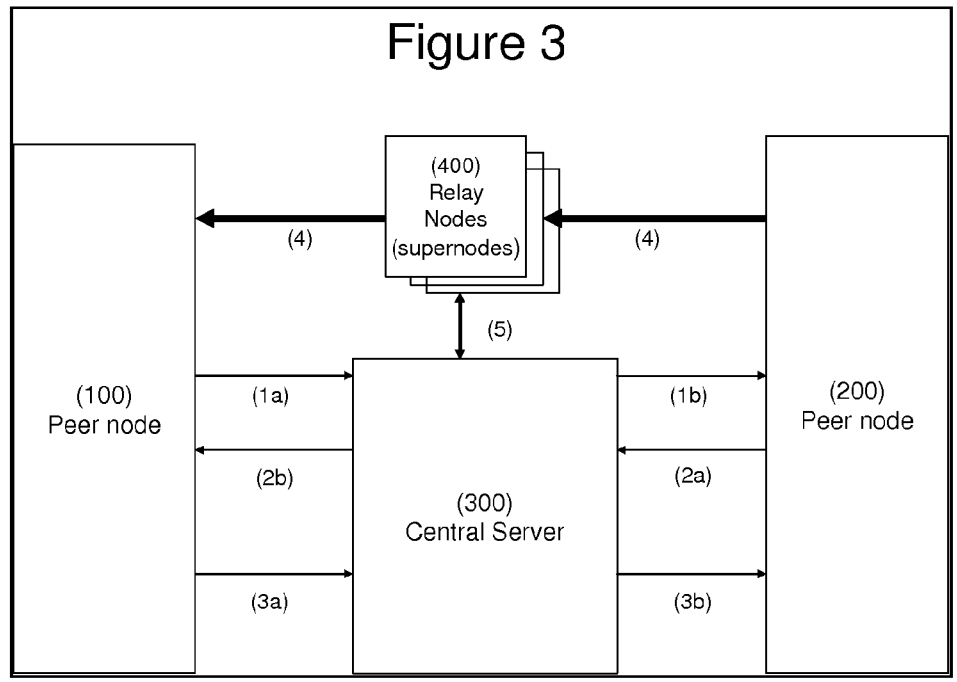
Prior Art
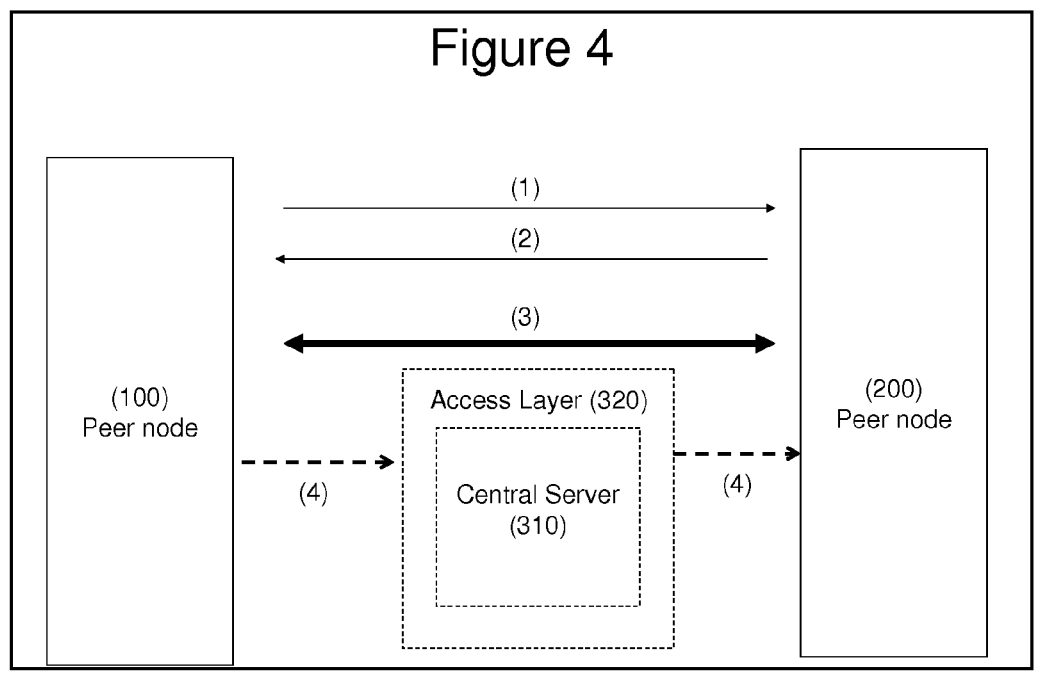

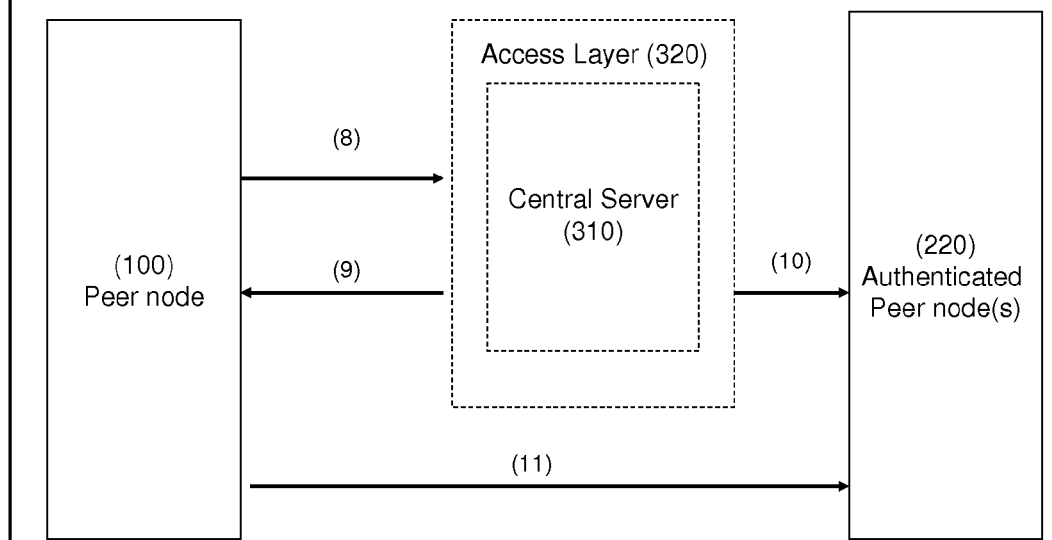
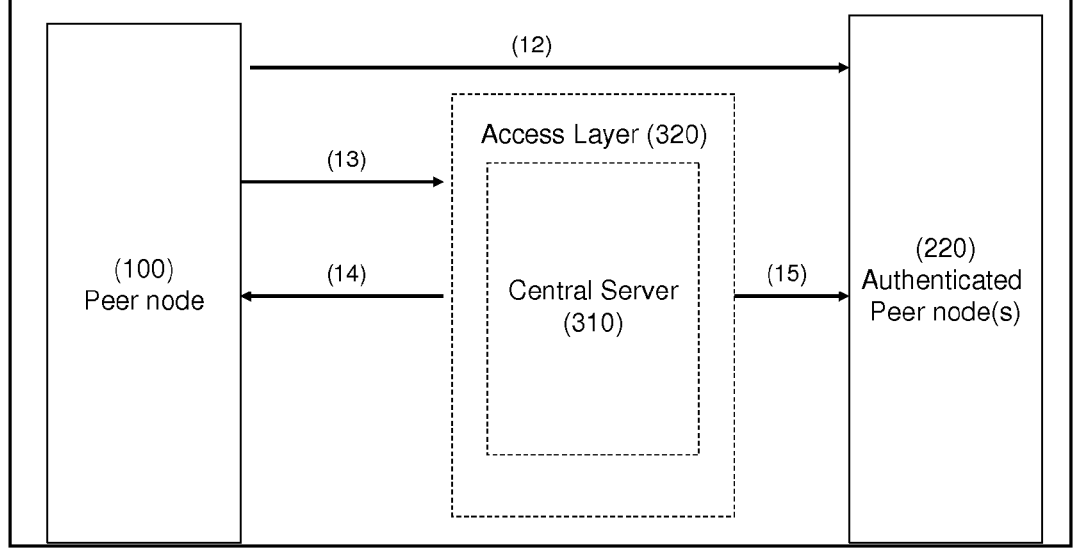

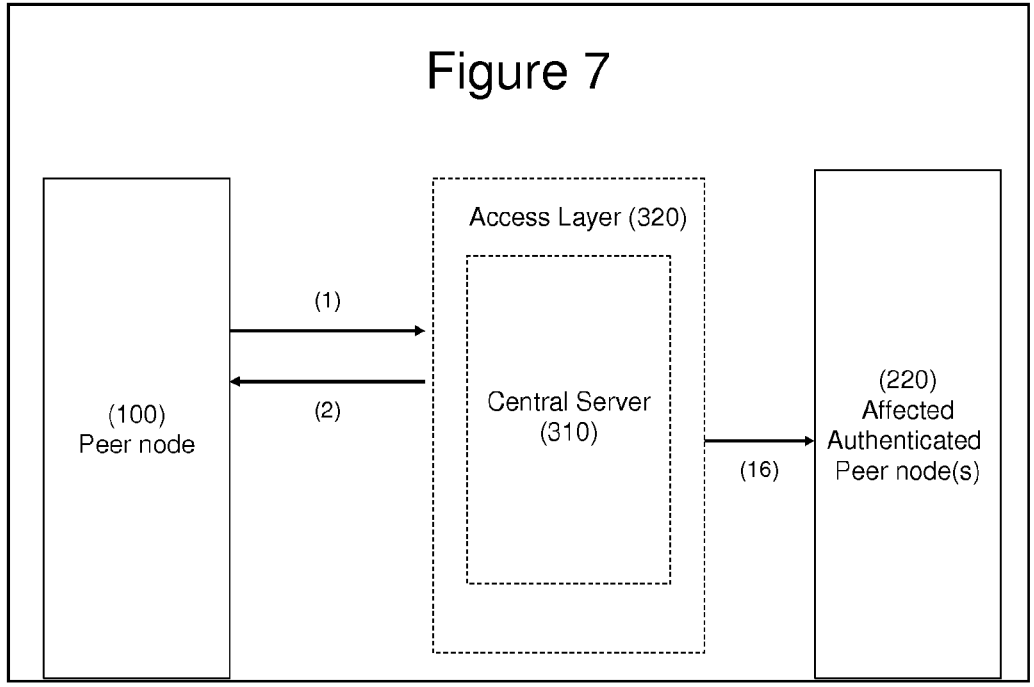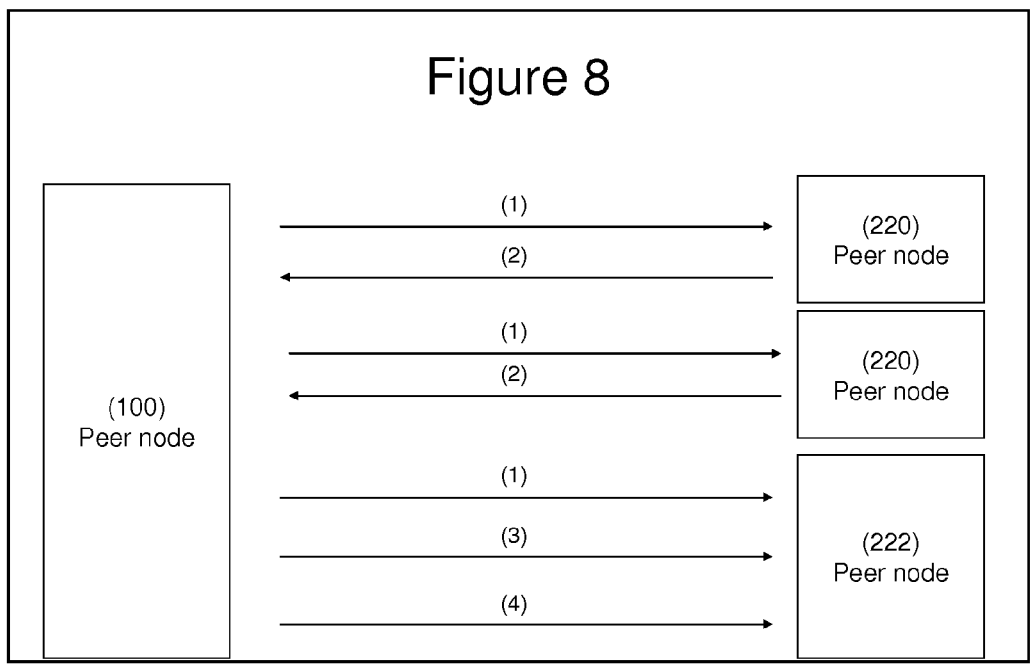

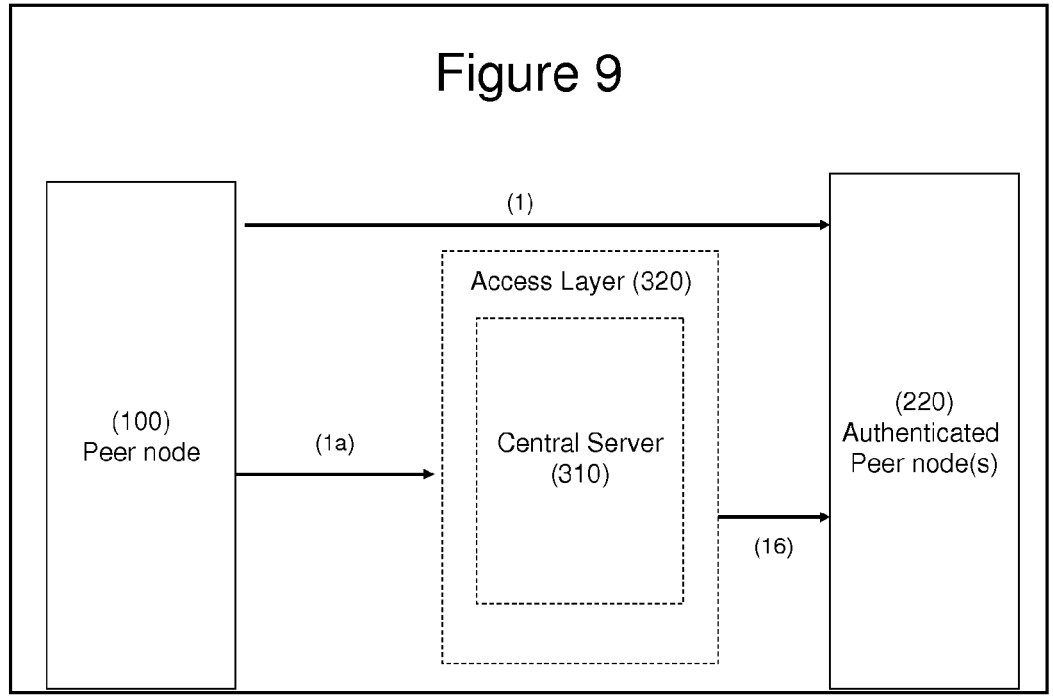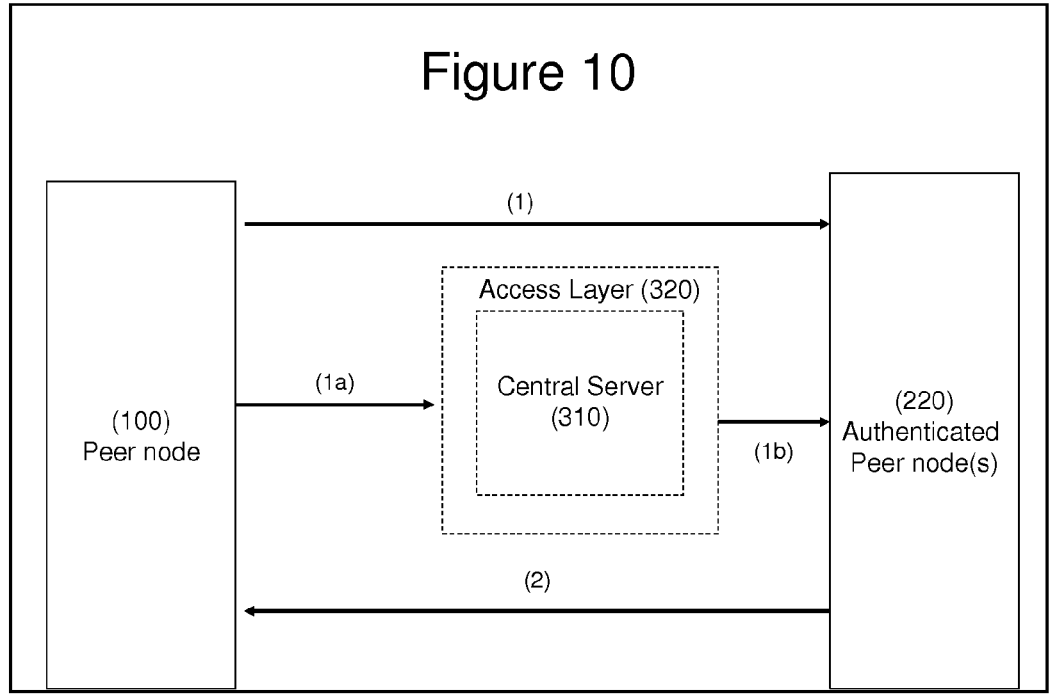

SELF-ADAPTING DIRECT PEER TO PEER COMMUNICATION AND MESSAGING SYSTEM

Priority is claimed from U.S. provisional patent application Ser. No. 61/510,817, filed Jul. 22, 2011.

TECHNICAL FIELD

The present invention relates generally to distributing data and messages, and more particularly to systems and methods for distributing data and messages in a self-adapting, direct peer to peer network operating over local and wide area networks.

BACKGROUND OF THE INVENTION

A peer to peer network is a network of two or more computers that employ a same program or type of program to communicate and share data. Each computer or peer (e.g., node) is typically considered equal in terms of responsibilities and acts as a server or relay to others in the network. In the invention, self-adapting direct peer to peer, each computer or peer does not act as a server or relay to others in a network at any time. A peer to peer network is unlike a client/server architecture where a dedicated central server is required. Peer to peer networks have become increasingly popular—users employ peer to peer networks for sharing of data, such as audio files, multimedia files, video files, programs, digital images and the like.

One common implementation of a peer to peer network utilizes a central server to maintain a list of nodes and data stored on the nodes, which is an implementation utilized by file sharing software such as Napster. FIG. 1 is a block diagram illustrating a system of a prior art type of peer to peer network implementation. The system includes a central server 300 and a plurality of nodes 100, 200. Respective nodes of the plurality of nodes can join and un-join the system at will. Upon joining, the nodes 100 provide (3) a list of files they are capable of serving to the central server 300. The central server 300 adds the list of files to a list of the available files of all nodes. Upon un-joining by the nodes, the list of files are removed from the list of available files for all the nodes. A requesting node 200 of the nodes requests a file by sending a request (4) for the file to the central server 300. The central server 300 maintains the list of available files of all nodes in the system and responds to the request with a list of nodes (5) capable of answering or satisfying the request. The requesting node 200 then makes a file request (1) to a node 100 that has the file, and the recipient node 100 responds with the file transfer (2). The requesting node 200 then obtains the file via a direct connection to the node 100 able to satisfy the request (hereinafter referred to as a transferring node). The central server 300 is not involved in the transfer of the file to the requesting node 200 (hence the name peer to peer).

Another common implementation of a peer to peer network utilizes a central server as the master which maintains a list of nodes, data about those nodes, and which is utilized in the request, response events of the nodes, and relay node or nodes that are utilized in the delivery of data and communications between the nodes. FIG. 2 is a block diagram illustrating a system of such type of peer to peer network with relay node implementation and FIG. 3 is a block diagram illustrating a system of such type of peer to peer network with supernodes, the addition of one or more relay nodes. The system includes a central server 300 and a plurality of nodes and relay nodes 100, 200 and 400. Respective nodes of the plurality of nodes can join and un-join the system at will. Upon joining, the nodes register with the central server 300. The central server 300 maintains the list of nodes and information pertaining to those nodes. Upon un-joining by the nodes, the nodes become unregistered on the central server 300.

In the conventional peer-to-peer network with relay node as shown in FIG. 2, a requesting node 100 of the nodes requests an action or event by sending a request (1a) to the central server 300. The central server 300 relays the request (1b) to the requested node 200, receives the response (2a) and relays the response (2b) to the requesting node 100. In the response, amongst other data, is the relay node able to satisfy the relay of the requested event or action. The requesting node 100 then confirms the action or event (3a) with the central server 300, which is relayed (3b) to the requested node 200, and the requesting and requested nodes are able to satisfy their requested action or event (4) via the relay node 400. The central server 300 is not involved in the relay of the action or event to the requesting node (hence the name peer to peer).

In a supernode peer-to-peer network as shown in FIG. 3, a requesting node 100 of the nodes requests an action or event by sending a request (1a) to the central server 300. The central server 300 relays the request (1b) to the requested node 200, receives the response (2a) and relays the response (2b) to the requesting node 100. In the request (1b) and response (2b), amongst other data, is the relay node or nodes 400 able to satisfy the relay of the requested event or action. The requesting node 100 then confirms the action or event (3a) with the central server 300, which is relayed (3b) to the requested node 200, and the requesting and requested nodes are able to satisfy (4) their requested action or event via the relay nodes 400. The central server 300 is not involved in the relay of the action or event to the requesting node 100 (hence the name peer to peer). In addition, the central server 300 periodically updates (5) the relay nodes 400 with relevant information including ability to service requests.

Although the conventional systems of FIG. 1, FIG. 2 and FIG. 3 perform adequately, there are a number of potential problems associated with such systems. One problem is that the system has a single point of failure—even though the central server is not involved in serving requests, the central server is involved in matching every request and determining a relay node or nodes. Thus, if the central server goes off-line, the entire network can cease to function. A second problem is lack of scalability; the central server is required to track relay nodes available at all nodes and determine which of these relay nodes are best suited to serve the action or event; and since nodes can appear and disappear, the central server must periodically contact each of the relay nodes (e.g., by pinging the nodes). Such repeated updating can be a significant burden on the central server and the burden increases coincidentally with an increase in number of nodes in the system.

Another problem is that each node may become a relay node without user knowledge. This can lead to performance problems on the nodes as they process and route anonymous traffic not related to their communications, and to security related problems as the node has no control over the origin or destination of the traffic that is being routed or the content and directives of the traffic.

SUMMARY OF THE INVENTION

The following is a summary of the invention in order to provide a basic understanding of some aspects of the invention. This summary is not intended to identify key/critical elements of the invention or to delineate the scope of the invention. Its sole purpose is to present some concepts of the invention in a simplified form as a prelude to the more detailed description that is presented later.

The present invention relates generally to systems and methods for data and message distribution, and more specifically to systems and methods that facilitate data and message distribution in peer to peer networks delivering communications, actions and events. The present invention provides a data and messaging distribution system that is highly scalable, and facilitates preserving anonymity of nodes or peers. A central server is employed to maintain a list of users from all nodes or peers in the system and, unlike conventional peer to peer networks, this central server is not required in order for the peer nodes to fully participate in messaging or communications events. The requests and responses are in a predefined machine readable format and indicate data or event requested and identifies the node making the request. Nodes are able to post requests for events as long as they, and the receiving peer node, have authenticated one another. Additionally, the nodes, upon specific events (eg. login and logout), register with the central server, and based on specific events, will receive messages from the central server. The peer node interaction with the central server is not required for the peers to fully interoperate with all other authorized peers.

The present invention is highly scalable due to the peers lack of reliance or requirement of the central server. Peer nodes can join or un-join the system, determine status, send and receive messages and audio, voice and video communications, and fully participate in events without the central server. In effect, once logged into the system, the peer nodes operate completely independently of the central servers. Additionally, large or small numbers of nodes can be present in the system since the central server has limited responsibilities (eg. login and logout) as compared with conventional peer to peer networks, and has no responsibilities with relay nodes, node to node messaging, communications and events. Further, the invention does not use nodes to facilitate transactions of other non-authorized nodes in a relay manner (eg. supernodes), which allows the system to scale without restriction. Anonymity is facilitated by the invention because each of the nodes does not maintain a full list of users and other nodes, but rather only maintains a list of authorized users and requests.

To the accomplishment of the foregoing and related ends, certain illustrative aspects of the invention are described herein in connection with the following description and the annexed drawings. These aspects are indicative of various ways in which the invention may be practiced, all of which are intended to be covered by the present invention. Other advantages and novel features of the invention may become apparent from the following detailed description of the invention when considered in conjunction with the drawings.

BRIEF DESCRIPTION OF THE DRAWINGS

FIG. 1 is a block diagram illustrating a prior art conventional peer to peer network.

FIG. 2 is a block diagram illustrating a prior art conventional peer to peer network with relay node.

FIG. 3 is a block diagram illustrating a prior art supernode-based peer to peer network.

FIG. 4 is a block diagram of a peer to peer network according to an aspect of the present invention.

FIG. 5 is a block diagram illustrating an aspect of the interaction between a node and the central server (e.g. login).

FIG. 6 is a block diagram illustrating an aspect of the interaction between a node and the central server (e.g. logout).

FIG. 7 is a block diagram illustrating an aspect of the interaction between a node and the central server (e.g. location update, activity request).

FIG. 8 is a block diagram illustrating an aspect of the interaction between authenticated nodes (e.g. keep alive).

FIG. 9 is a block diagram illustrating an aspect of a node sending an update to authenticated nodes (e.g. status).

FIG. 10 is a block diagram illustrating an aspect of a node sending an event or activity request to an authenticated node

DETAILED DESCRIPTION OF THE INVENTION

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

It is to be appreciated that, for purposes of the present invention, any or all of the functionality associated with modules, systems and/or components discussed herein can be achieved in any of a variety of ways (e.g. combination or individual implementations of active server pages (ASPS), common gateway interfaces (CGIs), application programming interfaces (API's), structured query language (SQL), component object model (COM), distributed COM (DCOM), system object model (SOM), distributed SOM (DSOM), ActiveX, common object request broker architecture (CORBA), database management systems (DBMSs), relational database management systems (RDBMSs), object-oriented database management system (ODBMSs), object-relational database management systems (ORDBMS), remote method invocation (RMI), C, C++, Java, practical extraction and reporting language (PERL), applets, HTML, dynamic HTML, server side includes (SSIs), extensible markup language (XML), portable document format (PDF), wireless markup language (WML), standard generalized markup language (SGML), handheld device markup language (HDML), graphics interchange format (GIF), joint photographic experts group (JPEG), binary large object (BLOB), other script or executable components).

FIG. 4 is a block diagram illustrating a data distribution system according to an aspect of the present invention. The data distribution system includes a host computer/server 310 and a plurality of nodes 100, 200. The data distribution system is a peer to peer network and thus, permits data content to be requested and transferred to and from the plurality of nodes via a request for event or activity (1), the authenticated response to the request for event or activity (2), and the engagement of the nodes fulfilling the request (3). Unlike other conventional peer to peer networks, the system does not require a central server 310 in order to request, acquire and manage the data, but instead employs a direct, self-adapting, peer to peer methodology. Furthermore, there is no requirement on the system to centrally track when the nodes enter and leave (e.g, join and un-join) the system. Additionally, the system employs a central access layer 320 to track and manage when nodes enter and leave, and optionally to track and relay requests and responses for events or activities (4).

The plurality of nodes 100, 200 make requests (1) for data, communications and messages, and in response to requests fill or serve requests (3) for data, communications and messages. The plurality of nodes 100, 200 are typically software components operating or executing on a computer or mobile system. The nodes 100, 200 are able to communicate and transfer data with each other and with the access layer 320, generally via a network connection (e.g., Internet, wireless network, local area network, wide area network, mobile data services and the like) employing established protocols.

The central server 310 controls and operates a central database and an access layer 320. The central server 310 includes a database for storing data regarding the status of nodes 100, 200 and data exchanged among the nodes. Access layer 320 provides an interface between the central server 310 and the plurality of nodes 100, 200, as well as an interface to the central server 310. The central server 310 can be accessed by a user or operator in order to modify and control the operation of the system. The nodes 100, 200 can access the central server 310 remotely through the access layer 320 via a network.

The central server 310 maintains a list of users, their information, authentication partnerships, location information, activity information, and status information in a predefined machine readable format; essentially functioning as the global directory for users in the context of the system deployment.

The central server 310 maintains, processes and responds to a list of requests from the nodes 100, 200. The requests include: login, logout, activity request (e.g. make audio call, receive video call, invite user, accept user), user information, location information.

FIG. 5 is a block diagram illustrating an aspect of the interaction between a node 100 and the central server 310 (e.g. login). Any one of the nodes 100 may login (8) to the central server 310 via the access layer 320, providing current location information, status information, and any relevant information in a predefined format. If successful (9), the node 100 may begin participating (11) in the self-adapting peer to peer network, and the central server 310 optionally sends a status update (10) to the authenticated partnership nodes 220 of the originating node 100. If the node 100 is unable to login to the central server 310 due to any number of potential issues (e.g. network connectivity), and if the node 100 has previously logged into the system and been successfully authenticated, it may login locally validating the entered authentication data against the stored previously successful authentication data. If successful, the node 100 may begin participating (11) in the self-adapting peer to peer network based on its previously stored authentication partnerships and related information. In this way, the plurality of nodes 100, 220 does not require the central server 310 for login. If the node 100 is successful at logging in locally, it will periodically, at predefined intervals, attempt to login (8) with the central server 310 via the access layer 320. If, once a connection has been established, the authentication succeeds with the central server 310, the node 100 receives the change in login status from local to network and also receives information (9) about the authentication partnerships, authentication requests that occurred while the node was offline, and other relevant information. If, once the connection has been established, the authentication fails against the central server 310, the node 100 is immediately logged off (10) from its peer nodes 220, the central server 310 sends an update (10) to peer nodes 220, and node 100 is not permitted to login locally until a successful network login has occurred with the central server 310.

FIG. 6 is a block diagram illustrating an aspect of the interaction between a node and the central server (e.g. logout). Each of the plurality of nodes 100 may logout with their authentication partnership nodes 220 directly on the peer to peer network (12) and the central server (13). When the node logs out, it sends a request (12) directly to all authentication partnership nodes with which it participates with a status update to offline. In addition, the node also sends a logout request (13) to the central server 310 via the access layer 320, which authenticates the request and if successful updates the relevant status and information in the central database. Once the central server has authenticated the logout event, the central server responds to the node (14), and sends out an update event (15) to the authentication peer nodes 220 of the originating node 100. Both of central server responses (14) and (15) are not required to the ongoing functioning of the system.

FIG. 7 is a block diagram illustrating an aspect of the interaction between a node 100 and the central server 310 (e.g. location update, activity request). The node 100 makes an event request (1) to the central server 310. After successful authentication of the request, the central server 310, in response to login, logout, updates of location or user information, and receipt of activity request, will send a response (2) to the originating node 100 and will send the appropriate information (16) to the affected authenticated partnership nodes 220 of the originating node 100. The affected authenticated partnership nodes 220 are those nodes that are either affected by the change in information provided by the originating node 100, or are being requested an activity by the originating node 100. Note these updates to the central server 310 are redundant to the direct, peer to peer messaging between the nodes 100 and 220, and are not required, but provided for fault tolerance.

Periodically, the plurality of nodes 100 check-in with the central server 310 in order to update, or to be updated, with new information. The nodes 100 do not require this periodic check-in in order to continue to operate and communicate with other nodes 220.

Each of the nodes 100 maintains a list of authenticated and request authentication users, their information, authentication partnerships, location information, and status information in a predefined machine readable format. An authenticated partnership is one in which two nodes have both accepted to be approved or authenticated by each other. In order to begin the authentication request, each node 100 must first retrieve the specific information about another node with which they wish to authenticate from the central server 310. Once a node 100 identifies the node with which they wish to request an authentication partnership, node 100 makes that request to the central server 310 and adds the node information into their list of request authentication users. The central server 310, either by sending to the requested node or by receiving a request from the requested node, sends the request information to the requested node. The requested node then either accepts, declines, blocks or ignores the request. Once the requested node accepts the request it is considered a reciprocal authentication partnership. Prior to this reciprocal authentication, no requests are sent or received between the two nodes. This information is periodically updated between authenticated nodes 220 without the requirement of the central server 310.

FIG. 8 is a block diagram illustrating an aspect of the interaction between authenticated nodes (e.g. keep alive). Each of the nodes 100 makes and receives status requests to/from the other nodes 220 with which it has an authenticated relationship with. The status update (keep alive) occurs at a pre-defined cycle (e.g. 60 seconds), and within the cycle a pre-defined number and interval of retries (e.g. 3 retries with an interval of 6 seconds). These are dynamic and vary based on network connectivity (throughput). Each reciprocal authentication node periodically, at the specified cycle, requests a status update from the corresponding node, which includes authentication information, current status, location and any other changed relevant information. In response, the receiving node, once authenticating the request, responds with the appropriate authentication, location, status and other changed relevant information. This status update between nodes is initiated within the pre-defined cycle, at the pre-defined interval (e.g. every 6 seconds). The originating node 100 sends a status update request (1) to the destination nodes 220, 222. If the destination node 222 does not respond within the pre-defined interval, another status update request (3) is sent. This continues for a pre-defined number (e.g. 3) of attempts (4), and at which time if no response from the destination node 222 is received the origination node 100 deems the destination node 222 to be offline and not currently reachable. If during this pre-defined interval the destination node 220 responds (2), the subsequent attempts by the originating node 100 are discontinued until the next cycle. The destination node 220 responds with information that includes authentication information, current status, location and any other changed relevant information. After authentication, both the originating and destination nodes self-adapt by updating their lists of authenticated nodes and related information. Both nodes may send originating status requests to each other at approximately the same time, which updates each of the nodes with the corresponding information and discontinues the status updates until the next cycle. The request-response messages are tracked on the nodes to determine and influence the next cycle. In this way, the plurality of nodes is responsible for authenticating and self-adapting themselves in the peer to peer system without the use of or reliance on the central server or any relay nodes.

FIG. 9 is a block diagram illustrating an aspect of a node 100 sending an update (e.g. status) to authenticated nodes 220. Each node may also alter its status either automatically (e.g. if the computer is idle for a period of time or if the computer changes its internal or external Internet Protocol address, the nodes sends the appropriate status update) or manually (e.g. if the user has selected a different status). When the status is changed, the node 100 sends an update request event directly (1) to all the authenticated nodes 220 and (1a) to the central server 310. This change is received by the authenticated nodes, authenticated, and the appropriate local changes made. Once the central server 310 has authenticated the request event, the central server sends out an update event (16) to the authentication partnerships 220 of the originating node. Both of central server request (1a) and update (16) are not required to the ongoing functioning of the system.

FIG. 10 is a block diagram illustrating an aspect of a node 100 sending an event or activity request (1) to an authenticated node 220. Each of the nodes is able to make event or activity requests to other authenticated nodes. These requests include: voice call, video call, instant message, data sharing (e.g. URL link), file sharing, voice conference, video conference. The originating node 100 selects the destination node or nodes 220 with which it wishes to begin an activity. The originating node 100 then sends the activity request (1) to the destination node or nodes 220. Additionally, the originating node 100 sends the request (1a) to the central server 310, which, upon authentication, sends the request (1b) to the destination node or nodes 220. This additional request (1a, 1b) to and from the central server 310 is redundant and not required under normal operations, but allows for the redundant request event to be additionally routed via the central server 310 should the direct peer-to-peer request event fail due to a temporary failure or blocking in network transmission. The activity request (1) or (1a) contains the requested activity, authentication information, location information, and any other relevant information for the requested activity. The destination node or nodes 220 receives the request, authenticates the request from the authentication credentials and the location credentials. If the location credentials fail, the destination node 220 sends a status update request as shown in FIG. 9 to the originating node 100 prior to responding to the activity request, and using the updated location credentials proceeds to authenticate the activity request. If the authentications fail, the request is ignored, no action is taken. If the authentications pass, the destination node 220 responds (2) to the originating node 100 with the appropriate information and protocol to begin the activity (e.g. answers a voice call by sending the ringing and answering signal messages, followed by voice transmission and receipt).

Each of the nodes is able to make external event or activity requests, either directly or indirectly via the central server or server computers on the network. These requests include: SMS-texting, voice calling to/from PSTN (Public Switched Telephone Network) connected phones and mobiles, and information feeds (e.g. news feeds, stock market feeds, weather feeds, travel feeds).

In the self-adapting direct peer to peer communication and messaging system, it is possible to be fully operational without a central server present. The central server can be taken offline or be made inaccessible, and the plurality of nodes will continue to function with updates, activity requests, communications and messaging.

While certain novel features of the present invention have been shown and described, it will be understood that various omissions, substitutions and changes in the forms and details of the device illustrated and in its operation can be made by those skilled in the art without departing from the spirit of the invention. What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

I claim:

1. A peer to peer communications system comprising:
   a plurality of peer nodes, each peer node comprising a communication module and a database;
   a central server comprising:
      a central database comprising identification information of each of the plurality of peer nodes;
      a central data processing module; and
      central communications means connecting the central server with the communication modules of the peer nodes;
   where the communication modules of each peer node are capable of connecting with communication modules of other peer nodes and with the central communication means,
   where a second peer node transmits to the central server a request for authorization and identification information to be relayed to a first peer node, and the central server relays the second peer node's request for authorization and identification information to the first peer node,
   where the communication module of a first peer node receives the request for authorization and identification information of the second peer node from the central server,
   upon receiving the request, the first peer node may authorize or decline to authorize the second peer node, and upon authorization, the first peer node enters the second peer node's identification information into the first peer node's database, establishing the second peer node as an authorized peer node;
   where the peer node is comprised of information about accessibility, location and authorization state of the peer node, and the database of the peer node is comprised of information about accessibility and location states of one or more authorized peer nodes, and the database of the peer node is not comprised of identification information of any of the plurality of peer nodes which have not been authorized;
   where the second peer node transmits a request to the first peer node, the request comprising identification information about the second peer node, and the first peer node compares the identification information received from the second peer node with the information stored in the database of the first peer node; and
   where the first peer node responds to the request from the second peer node only if the identification information received from the second peer node identifies the first peer node as an authorized peer node in the first peer node database.

2. The communications system of claim 1, further comprising:
   a central access layer providing peer nodes with access to the central database for information as to authorized peer nodes, subject to the peer node satisfying an authenticated request.

3. The communications system of claim 2, further comprising:
   access by and for the peer nodes based on events recorded by the central database.

4. The communications system of claim 2, further comprising a host computer that controls login, logout, updates and the central access layer.

5. The communications system of claim 1, the request comprising identifying data relating to an action or event being requested and data identifying the peer node initiating the requested action or event.

6. The communications system of claim 5, the node identifying data further comprising authentication.

7. The communications system of claim 5, the action or event request comprising status update information.

8. The communications system of claim 1, the request further comprising at least one of: message, text, audio, voice, video, image, electronic media, or file data.

9. The communications system of claim 1, where the data storage module of the peer node is populated through a process of requests for authorization originating from one or more other peer nodes, transmitted to the peer node from a central server.

10. A method of operating a data distribution and messaging system comprising:
    providing a plurality of peer nodes, each peer node comprising data storage and data transmission modules;
    providing a central server with a database of status information of each of the plurality of peer nodes and a database of requests;
    allowing a first peer node to receive a request for authorization and identification information of a second peer node, the request for authorization being transmitted from the central server, and upon receiving the request, the first peer node may authorize or decline to authorize the second peer node, and upon authorization, the first peer node enters the second peer node's identification information into the data storage module, establishing the second peer node as an authorized peer node, and where if the authorization of the second peer node is declined, the second peer node's identification information is not stored in the data storage module;
    storing a set of status information of authorized peer nodes in the first peer node's data storage module;
    the first peer node of the plurality of peer nodes transmitting an action request and identification information to the second peer node, and the second peer node receiving the action request and identification information from the first peer node;
    the second peer node of the plurality of peer nodes adding the action request to a list of requests stored on the second peer node only if the identification information is from an authorized peer node and ignoring any request associated with a peer node whose identification information is not in the data storage module;
    transmitting the action request and set of status information to the central server; and
    updating the database of requests with the action request.

11. The method of claim 10, where upon comparing the identification information with the set of status information, the second peer node determines that the first peer node has not been previously authorized, and the second peer node blocks or ignores the request.

12. The method of claim 10, where determining which request of the list of requests to act upon comprises considering factors associated with the request.

13. The method of claim 10 further comprising the second peer node communicating with the first peer node to further authenticate the requested event.

14. The method of claim 10, further comprising the second peer node reporting to the first peer node as to the status of the request.

15. The method of claim 10 further comprising:
    updating the database of status information with the set of status information.

16. The method of claim 10, further comprising:
the second peer node receiving confirmation from the central server that the first peer node has authorized the second peer node; and
the second peer node entering the first peer node's identification information into the data storage module, establishing the first peer node as an authorized peer node.

\* \* \* \* \*